Figure 1:
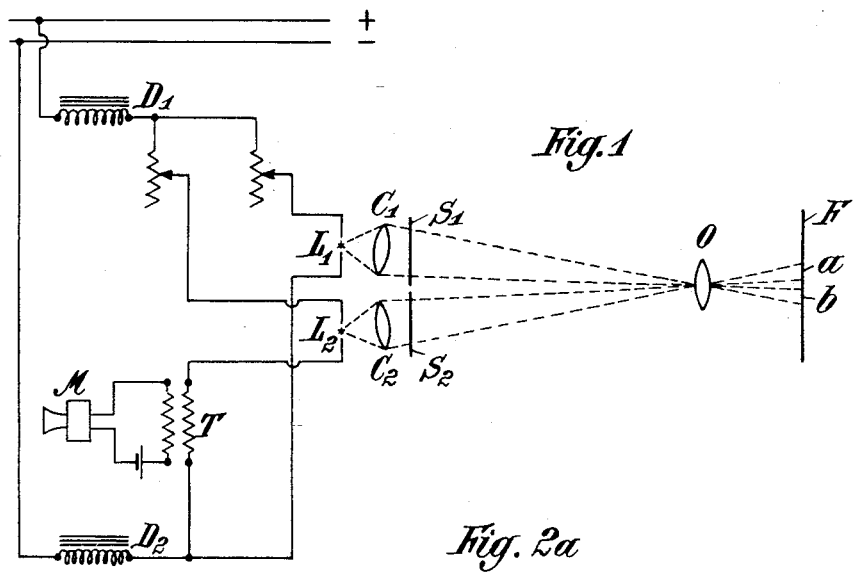

Oct. 10, 1933.  H. KÖNEMANN  1,930,362

TALKING FILM

Filed Aug. 28, 1930

Inventor:
Heinrich Könemann

Patented Oct. 10, 1933

1,930,362

UNITED STATES PATENT OFFICE 1,930,362

TALKING FILM

Heinrich Könemann, Munster, Germany

Application August 28, 1930, Serial No. 478,525, and in Germany March 19, 1929

5 Claims. (Cl. 179—100.3)

When the recording of sound in talking films is effected by the intensity of blackening on the film, no efforts should be spared to ensure that the degree of blackening corresponds to the amplitude of the sound waves. When a lamp (glow or arc lamp) is used, the difficulty is that in many cases the light emitted by the lamp does not vary in linear proportion to the original microphone current, for it is well known that in many sources of light the emission of light increases in a greater ratio than the electric current passing through the lamp. Moreover the blackening of the silver bromide layer must correspond to the intensity of the light incident at the time, which, to judge by the blackening diagrams of many kinds of films, is the case only up to a certain degree (bent blackening lines).

The consequence of these defects appearing in photographing the sound is that during the reproduction, linear and nonlinear distortions are easily liable to be produced, which make an unpleasant impression on the ear and reproduce the original sound in a modified timbre.

According to this invention it is proposed to produce, by means of electric alternating currents, wave-like variations displaced 180° relatively to each other in the light intensity of two lamps. The blackening lines or dashes corresponding to the light fluctuations of the two lamps are recorded on two intensity strips, the wave records of which are displaced by half a period (180°) relatively to each other.

During the reproduction, each blackening strip acts on a cell sensitive to light, and these cells in their turn act on the valves of an amplifier of the kind having symmetrical connection, i. e., of the "push-pull" type.

The two series of sounds are therefore situated on the film next to each other without a relative displacement, that is to say the records belonging to a given moment of the recording are situated at the same level of the film in the two strips. A wave maximum of the microphone current corresponds, however, to a maximum blackening on one strip, and a maximum brightness on the other.

Theoretically it may be explained that the distortion-correcting effect of this arrangement is that during the reproduction by means of two photo-electric cells, the above mentioned distortions will be cancelled so that the loud speaker will reproduce only the vibrations which agree with the oscillations taken up by the microphone.

The recording for these double sound strips can be effected by causing light from two sources of the same power, to record on the film two series of sounds, the sources of light being controlled by the microphone amplifier in such a manner that while the light of one source is decreasing, the light of the other one increases. It is immaterial how this control of the light falling on the film is effected, whether by the control of glow or arc lamps, by rotation of planes of polarization, by means of thread electroscopes or by other methods. The material point is that the recording takes place in two series of sound in records which are opposed or have 180° phase displacement with respect to their illumination.

During the reproduction, both series of sound can be illuminated by one and the same source of light as the points corresponding to each other are situated in one and the same transverse line of the film. The fluctuations of light are however projected separately on two light-sensitive cells which actuate a symmetrical connection amplifier in the above mentioned manner.

Figure 2A:
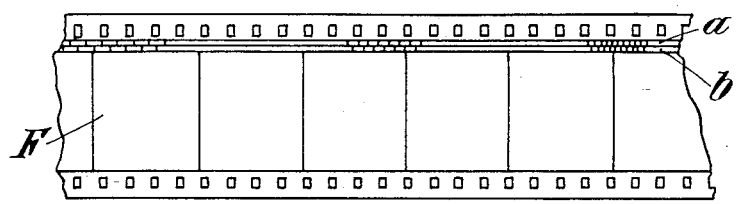
Figure 2B:
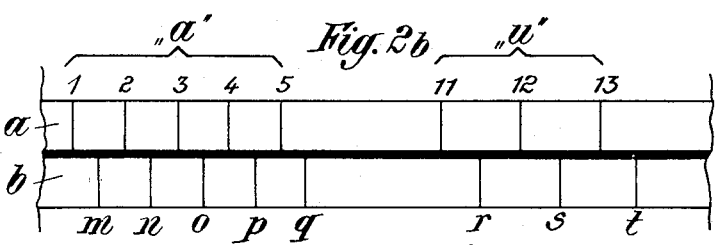

The accompanying drawing shows by way of example a construction of a control apparatus according to the invention for talking film purposes. In the drawing, Figure 1 shows an arrangement for recording, Figure 2a a piece of film with a record according to the invention, Figure 2b is an enlarged representation of the two series of sounds, Figure 3 an arrangement for reproduction.

The lamps L1 and L2 are supplied with current from the direct current mains (Figure 1) with the interposition of choke coils D1 and D2. Both lamps burn uniformly but not with the full strength of current. On these two lamps is superimposed, by means of the transformer T, the current of the microphone M. As shown in Figure 1 the connections are such that when at one half-wave of the transformer T the current in L1 increases, it will simultaneously decrease in L2. The process becomes reversed for the other half-wave.

Accordingly the light from the lamp L1 will increase when the light from L2 decreases and conversely. The light from L1 and L2 is collected by two condensers C1 and C2, in front of which are arranged two slots S1 and S2. The lens O projects reduced images of the said two slots S1 and S2 on to the film F.

Consequently, on one and the same transverse line of the film alternately light and dark places will correspond to the light fluctuations of the lamps L1 and L2, and hence to the microphone currents. After exposure and development the film F will correspond to Figure 2a, where a and b are the two blackening strips in which the light and dark places are alternately displaced at 180°, whatever the period of the sound recorded may be.

If the (greatly enlarged) sound record series a (Figure 2b) corresponds in the blackenings 1, 2, 3, 4, 5 to the vowel "a" and in 11, 12, 13 to the vowel "u", the adjoining records m, n o, p, q of the second sound series b will belong to the vowel "a" and r, s, t, to the vowel "u". If the blackening 1 is produced by any desired positive wave-half of the microphone current, the blackening m will be produced by the negative wave-half belonging to this positive one. The blackening m corresponds therefore to the lightening between 1 and 2, and the blackening 2 to the lightening between m and n. The same applies to 11, 12, 13 and r, s, t.

Figure 3:
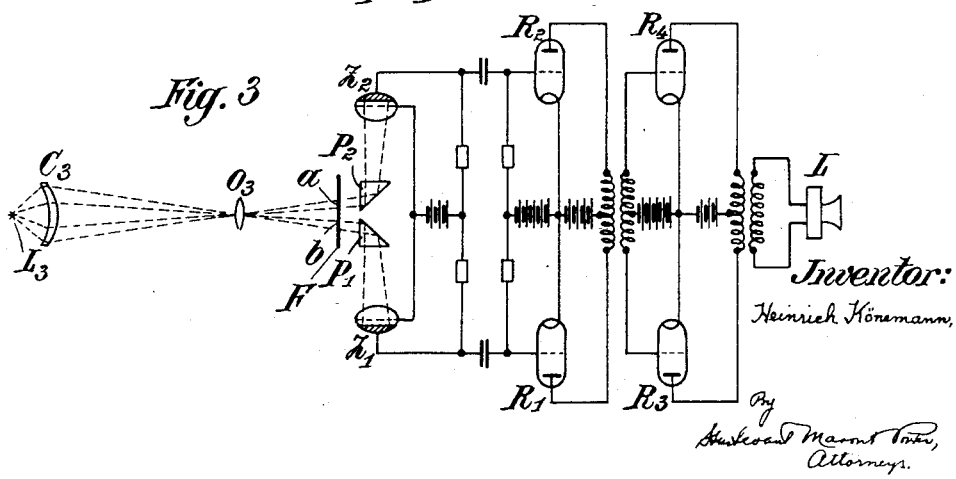

Figure 3 shows diagrammatically reproduction apparatus for a film operating according to the push-pull process explained in connection with Figures 1 and 2.

The light from a constantly burning lamp L3 is collected by the condenser C3 and projected through the lens O3 through the two strips a and b of the film F to two prisms P1 and P2 which reflect it through 90° to two photo-electric cells Z1 and Z2. These cells each act in the well known manner on a symmetrical connection amplifier, namely the cell Z1 on the valves R1 and R3, and Z2 on R2 and R4. The currents thus amplified are combined in the output transformer and supplied to the loud speaker L.

The currents of the two photo-electric cells could be combined of course also by an arrangement having for symmetrically connected amplifiers with an output transformer and then transmitted to an ordinary amplifier.

The construction according to the invention hereinbefore described has further the following important advantage:

In the same way as in the amplifier technique, the working point can be lowered on the characteristic curve of the valves when working according to the push-pull process, that is to say the working can be done with a greater negative grid bias and in that way a lengthened characteristic line obtained. Also the opposite phase recording according to the invention makes it possible to use a weaker working illumination of the film (illumination when the microphone is at rest) than otherwise usual. This ensures that there will be a greater blackening range for great amplitudes of the currents to be recorded.

I claim:

1. An apparatus for photographically recording sound comprising a microphone, a source of direct current, two electrically actuated light-producing means fed from said source, means for maintaining substantially constant the total current fed to the two light-producing means, means operated by the microphone for increasing momentarily the current flowing through one light-producing means while decreasing the current flowing through the other light-producing means whereby the light-producing means are caused to vary inversely in their illumination intensities, and means for separately recording in correlation the illumination intensities of the two light-producing means.

2. An apparatus for photographically recording sound comprising a microphone, a source of direct current, two electrically actuated light-producing means fed in parallel from said source, means operated by the microphone for increasing the current flowing in one light-producing means and simultaneously decreasing the current flowing to the other light-producing means whereby to cause a counter-distortion of the light of one light-producing means upon a distortion of the light of the other light-producing means from a predetermined sound-intensity to light-intensity ratio, and means for separately recording in correlation the illuminating intensities of the two light-producing means.

3. The process of recording and reproducing sound through the agency of a sound-record film, which comprises varying the intensities of two sources of light oppositely in accordance with the sound vibrations whereby a distortion of the light of one source is accompanied by a counterdistortion of the light of the other source, separately recording in correlation the illumination intensities of the two sources, employing the correlated records to produce individual currents varying with the records, and reproducing sound by the combined effects of said currents whereby a distortion of one current is compensated by the counterdistortion of the other current.

4. An apparatus for recording and reproducing sound through the agency of a sound-record film comprising a microphone, a source of electric current, two electrically actuated light-producing means fed from said source, means for maintaining substantially constant the total current fed to the two light-producing means, means operated by the microphone for increasing momentarily the current flowing through one light-producing means while decreasing the current flowing through the other light-producing means whereby the sound recording means are caused to vary inversely in their illumination intensities, means for separately recording in correlation the illumination intensities of the two light-producing means as two correlated series of photographic sound records which vary oppositely in density, a source of light for illuminating the two series of sound records, separate light responsive devices each in the path of light rays from one of said series, and amplifying devices including at least one pair of electron discharge devices having each a control element and an output element and connected symmetrically in a push-pull circuit, means for imposing upon the control elements currents flowing through said light responsive devices whereby the said electron discharge devices operate oppositely in phase relationship, and a sound producing means actuated by the currents flowing through the output elements.

5. An apparatus for recording and reproducing sound through the agency of a sound-record film comprising a microphone, a source of electric current, two electrically actuated light-producing means fed from said source, means for maintaining substantially constant the total current fed to the two light-producing means, means operated by the microphone for increasing momentarily the current flowing through one light-producing means while decreasing the current flowing through the other light-producing means whereby the light-producing means are caused to vary inversely in their illumination intensities, means for separately recording in correlation the illumination intensities of the two light-producing means as two correlated series of photographic sound records which vary oppositely in density, a source of light for illuminating both series of sound records, separate light-responsive devices in the path of light rays from said series, two amplifying apparatus each including electron discharge devices and controlled by the current from one said light-responsive device, means for superimposing the currents flowing through said electron discharge devices, and sound producing means actuated by the superimposed currents whereby distortions of current in one electron discharge device from a true value are compensated by counterdistortions of the current in the other electron discharge device.

HEINRICH KÖNEMANN.